Nov. 13, 1923.                        1,474,192
F. A. GESSLER ET AL
RELIEF VALVE
Filed April 2, 1921
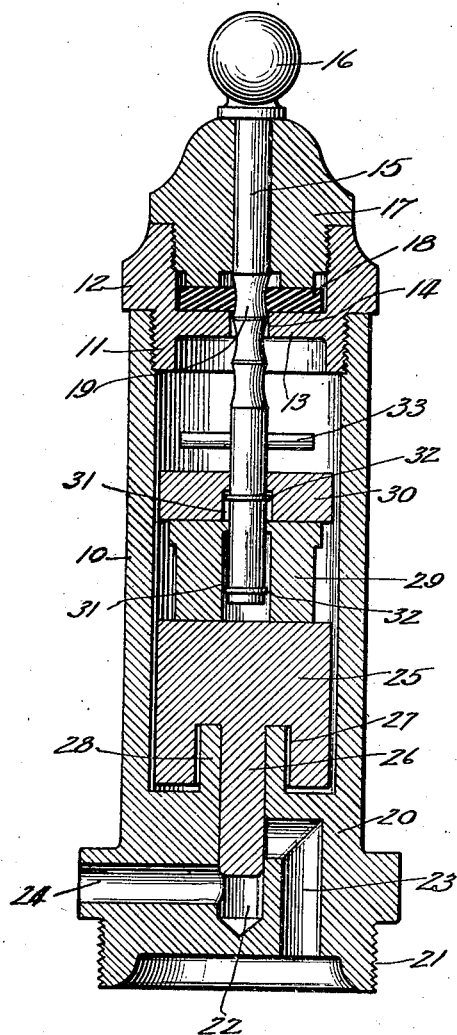
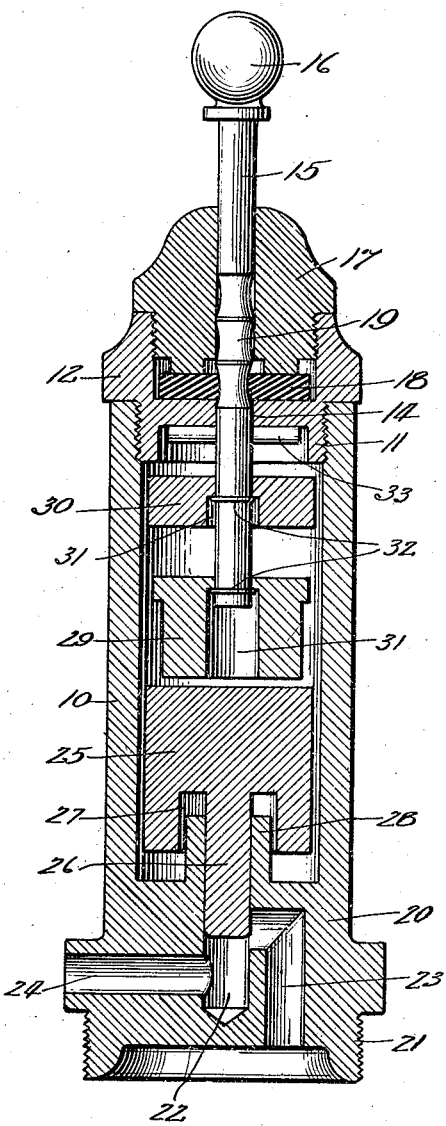
Inventors:
Frederick A. Gessler,
Robert C. Mitchell
By Banning & Banning
Attys Patented Nov. 13, 1923.

1,474,192

UNITED STATES PATENT OFFICE.

FREDERICK A. GESSLER, OF LA GRANGE, ILLINOIS, AND ROBERT B. MITCHELL, OF HILLSDALE, MICHIGAN, ASSIGNORS TO ELECTRIC MILKER CORPORATION, OF CHICAGO, ILLINOIS, A CORPORATION OF DELAWARE.

RELIEF VALVE.

Application filed April 2, 1921. Serial No. 458,122.

*To all whom it may concern:*

Be it known that we, FREDERICK A. GESSLER and ROBERT B. MITCHELL, both citizens of the United States, residing at La Grange, in the county of Cook and State of Illinois, and at Hillsdale, in the county of Hillsdale and State of Michigan, respectively, have invented certain new and useful Improvements in Relief Valves, of which the following is a specification.

This invention relates to a relief valve designed for use in maintaining a given degree of vacuum or pressure. The object of the invention is to so construct the device that the same may be adjusted to afford relief when the desired degree of vacuum or pressure has been established, the adjustment being effected without the use of springs or the like which might tend to become impaired through continued usage, or might otherwise be uncertain or unsatisfactory in use.

In the drawing:

Figure 1 is a sectional elevation of the relief valve, showing the same adjusted to withstand a maximum degree of pressure or vacuum; and Fig. 2 is a similar view, showing the device with the parts occupying a position of adjustment for minimum pressure or vacuum with the valve elevated to afford relief.

The device consists of a cylindrical shell 10 closed at its upper end by means of a threaded ring 11 having a flange 12 which abuts against the upper edge of the shell. The ring is provided with a cross wall 13 having through its center a smooth aperture 14 through which extends an adjusting rod 15 having a knob or handle 16 at its upper end. The ring 12 is recessed and threaded to receive a closing plug 17 through which the rod 15 extends, and said closing plug bears upon a locking disk 18 of rubber or other similar elastic material through which the adjusting rod protrudes. The adjusting rod is provided with a series of two or more circumferential shallow grooves 19, three being shown for purposes of illustration, and this series of adjacent grooves co-act with the elastic locking ring in such a way as to maintain the rod in any desired position of adjustment; that is to say, the elastic ring will yield sufficiently to permit the elevated portions of the rod to be pulled or pushed through the disk, which latter, however, will contract sufficiently to engage with any one of the grooves after the adjustment has been effected by the expenditure of sufficient force to compress the material composing the disk.

The lower end of the shell merges into a base 20, preferably screw-threaded at the point 21 to engage with the pipe, receptacle, coupling or the like, to which the relief valve is applied. The base is provided in its center with a vertical valve passage 22 with which at different levels the passages 23 and 24 communicate. When these latter passages are in communication with one another through the passage 21, the relief conditions will be established, but in order to prevent such communication, the main valve weight 25 is provided, which weight has depending therefrom a valve stem 26 adapted to slide within the vertical passage 22, so that when the weight is in lowered or normal position, the valve stem will bridge the space between the passages 23 and 24, thereby blocking communication from one to the other. The main valve weight is provided with an annular channel 27 into which protrudes a boss 28, the upper edge of which affords a seating surface for the valve weight.

Above the main valve weight are located one or more supplemental weights, two being shown for purposes of illustration. The lowermost supplemental weight 29 in normal or unadjusted position rests directly upon the weight 25, and in like manner the second supplemental weight 30 rests upon the first supplemental weight 29, as shown in Fig. 1. Obviously additional weights might likewise be superimposed one upon another depending upon the capacity for adjustment which is desired. Each of the supplemental weights is provided through its center with a counter bore 31 through which the lower end of the adjusting rod extends. The adjusting rod is provided with stop flanges 32 normally lying within the counter bore and adapted, when the rod is drawn upwardly, to lift one or more of the superimposed weights depending upon the degree of adjustment required.

It will be observed that the relation of the parts is such that when the adjusting rod is raised to the first position of adjustment, the uppermost weight will be elevated, but the spacing of the stop flanges 32 is such that the lowermost flange will travel freely within the counterbore in the first supplemental weight until the second position of adjustment of the rod is approached, after which a continued movement of the rod will lift the first supplemental weight together with the second, so that the weighted valve alone will act to resist the pressure or vacuum conditions which the valve is designed to control. In order to prevent the rod from being drawn upwardly to an objectionable degree, a cross stop pin 33 is provided which limits the extent of movement of the adjusting rod.

The operation of the device is as follows: With the parts in the position shown in Fig. 1, all three of the weights will exert their combined pressure in maintaining the valve in closed position, so that a high degree of pressure or vacuum will be maintained before relief is afforded. With the parts adjusted as in Fig. 2, the two supplemental weights are supported from the adjusting rod, so that they are ineffective in lending assistance to the valve weight, which latter alone will resist the conditions seeking relief. In the same way an intermediate adjustment of the rod will allow the first supplemental weight to combine with the main weight, and it is obvious that three or more supplemental weights might be added to the column, the range of adjustments being increased without departing from the spirit of the invention.

We claim:

1. In a relief valve, the combination of a shell, a base to which the shell is attached, a relief passage extending through the base, a weighted valve controlling the relief passage, an adjusting rod extending vertically from a point above the main weight to the exterior of the casing, a supplemental weight surrounding the lower end of the adjusting rod, and stops on the supplemental weight and rod respectively for engaging the weight to the rod after the rod has been retracted to a given degree to raise and hold the supplemental weight out of contact with the weighted valve, substantially as described.

2. In a relief valve, the combination of a casing, a base to which the casing is secured, said base being provided with a relief passage, a closure for the upper end of the casing, a weighted valve for controlling the relief passage, an adjusting rod adapted to be moved through the closure and held in various positions of adjustment, a series of supplemental weights surrounding the lower end of the adjusting rod, and a series of stop members positioned to successively lift the supplemental weights composing the series, said lifting effect progressing from the uppermost to the lowermost weight composing the column, substantially as described.

FREDERICK A. GESSLER.
ROBERT B. MITCHELL.